United States Patent
Fujimura et al.

(10) Patent No.: US 12,409,443 B2
(45) Date of Patent: Sep. 9, 2025

(54) METAL-SUPPORTED CATALYST AND METHOD FOR PRODUCING HYDROGENATED CONJUGATED-DIENE-BASED POLYMER

(71) Applicant: ZEON CORPORATION, Tokyo (JP)

(72) Inventors: Yoshiki Fujimura, Tokyo (JP); Akito Nakai, Tokyo (JP); Kenichiro Sumiura, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 574 days.

(21) Appl. No.: 17/497,488

(22) Filed: Oct. 8, 2021

(65) Prior Publication Data

US 2022/0023840 A1 Jan. 27, 2022

Related U.S. Application Data

(62) Division of application No. 16/087,710, filed as application No. PCT/JP2017/012716 on Mar. 28, 2017, now abandoned.

(30) Foreign Application Priority Data

Mar. 31, 2016 (JP) ................. 2016-072665
Aug. 25, 2016 (JP) ................. 2016-164711

(51) Int. Cl.
*B01J 23/44* (2006.01)
*B01J 35/40* (2024.01)
*B01J 35/50* (2024.01)
*B01J 37/00* (2006.01)
*B01J 37/02* (2006.01)
*C08F 8/04* (2006.01)
*C08F 36/04* (2006.01)
*C08F 236/12* (2006.01)

(52) U.S. Cl.
CPC .............. *B01J 23/44* (2013.01); *B01J 35/40* (2024.01); *B01J 35/50* (2024.01); *B01J 37/0036* (2013.01); *B01J 37/0201* (2013.01); *C08F 8/04* (2013.01); *C08F 36/04* (2013.01); *C08F 236/12* (2013.01)

(58) Field of Classification Search
None
See application file for complete search history.

(56) References Cited

U.S. PATENT DOCUMENTS

| | | | |
|---|---|---|---|
| 3,986,947 A * | 10/1976 | Wilson | C10G 35/085 208/138 |
| 4,452,951 A | 6/1984 | Kubo et al. | |
| 6,376,622 B1 | 4/2002 | Hucul | |
| 6,984,668 B1 | 1/2006 | Eastham et al. | |
| 2005/0048658 A1* | 3/2005 | Johnson | B01J 23/50 502/329 |
| 2008/0269533 A1 | 10/2008 | Chang et al. | |

FOREIGN PATENT DOCUMENTS

| | | |
|---|---|---|
| CN | 1409730 A | 4/2003 |
| CN | 101003011 A | 7/2007 |
| CN | 101780406 A | 7/2010 |
| CN | 101954278 A | 1/2011 |
| JP | S57-205404 A | 12/1982 |
| JP | S58-17103 A | 2/1983 |
| JP | 2007-229641 A | 9/2007 |

OTHER PUBLICATIONS

Machine Translation for JPS57 205404 (Year: 1982).*
May 30, 2017 International Search Report issued in International Patent Application No. PCT/JP2017/012716.
May 30, 2017 International Search Report issued in International Patent Application No. PCT/JP2017/012715.
U.S. Appl. No. 16/087,710, filed Sep. 24, 2018 in the name of Yoshiki Fujimura et al.
Oct. 2, 2018 International Preliminary Report on Patentability issued in International Patent Application No. PCT/JP2017/012715.
Oct. 30, 2019 Search Report issued in European Patent Application No. 17775122.9.
Nov. 5, 2019 Search Report issued in European Patent Application No. 17775121.1.
Database WPI. Week 198209 Thomson Scientific, London, GB; AN 1982-17118E. XP002795021, –& NL 8 003 898 A (Nederland ORG TNO) Feb. 1, 1982.
Database WPI. Week 201132 Thomson Scientific, London, GB; AN 2011-D02592. XP002795022, –& CN 101 954 278 A (Chenzhou Gaoxin Platinum CO LTD) Jan. 26, 2011.
Feb. 21, 2020 Office Action issued in U.S. Appl. No. 16/087,723.
Sep. 3, 2020 Office Action issued in U.S. Appl. No. 16/087,723.
Jun. 11, 2021 Office Action Issued in U.S. Appl. No. 16/087,723.
Apr. 23, 2025 Office Action issued in European Patent Application No. 17 775 122.9.
Apr. 23, 2025 Office Action issued in European Patent Application No. 17 775 121.1.

* cited by examiner

*Primary Examiner* — Michael Forrest

(74) *Attorney, Agent, or Firm* — Oliff PLC

(57) ABSTRACT

A metal-supported catalyst is obtained by supporting a metal and/or a metal compound on a carrier, wherein a rate of decrease in the metal and/or the metal compound contained in the metal-supported catalyst is 20 wt % or more when the metal-supported catalyst is shaken in an aqueous solution of 2.3 wt % of polyvinylpyrrolidone in a hydrogen atmosphere at a temperature of 50° C. at 36 rpm for 1 hour.

6 Claims, No Drawings

METAL-SUPPORTED CATALYST AND METHOD FOR PRODUCING HYDROGENATED CONJUGATED-DIENE-BASED POLYMER

CROSS REFERENCE TO RELATED APPLICATION

This application is a divisional application of U.S. application Ser. No. 16/087,710, filed Sep. 24, 2018, the contents of which are incorporated herein by reference.

TECHNICAL FIELD

The present invention relates to a metal-supported catalyst and a method for producing a hydrogenated, conjugated diene-based polymer and, more specifically, relates to a metal-supported catalyst capable of achieving a high hydrogenation ratio and a method for producing a hydrogenated, conjugated diene-based polymer using such a metal-supported catalyst.

BACKGROUND ART

In chemical industry for producing pharmaco- and agrochemicals, petrochemicals, polymers, and the like, hydrogenation reactions are widely carried out in which carbon-carbon unsaturated bonds and carbon-nitrogen unsaturated bonds contained in various compounds are hydrogenated for conversion to the corresponding saturated bonds.

For example, in the field of polymer production, a method for selectively or partially hydrogenating carbon-carbon double bonds of conjugated diene-based polymers is known as a useful means for reforming the conjugated diene-based polymers, and hydrogenated, conjugated diene-based polymers such as hydrogenated acrylonitrile-butadiene copolymers are produced on an industrial scale.

Such a hydrogenated, conjugated diene-based polymer is produced by, for example, the following production process. That is, such a hydrogenated, conjugated diene-based polymer is produced by subjecting a monomer containing a conjugated diene to emulsion polymerization, coagulating and drying the latex obtained by emulsion polymerization, then dissolving the raw material polymer obtained by coagulation and drying in an organic solvent (a hydrogenation reaction solvent), adding a metal-containing catalyst such as a platinum group element to the obtained solution of the raw material polymer, and carrying out hydrogenation.

Examples of the metal-containing catalyst used in the above process include metal elements and compounds of metal elements, and such metal elements and compounds of metal elements are, for example, used as metal-supported catalysts by being supported on carriers (see, for example, Patent Document 1).

RELATED ART

Patent Document

Patent Document 1: Japanese Patent Laid-Open No. 58-17103

SUMMARY OF THE INVENTION

Problem to be Solved by the Invention

Meanwhile, the metal-supported catalyst described above generally contains a rare metal such as a platinum group element, and accordingly such a metal-supported catalyst is required to provide a sufficient hydrogenation ratio even when used in a small amount.

The present invention was made in view of such a circumstance, and an object is to provide a metal-supported catalyst capable of achieving a high hydrogenation ratio.

Means for Solving the Problem

Having conducted diligent research on an improvement of a hydrogenation ratio in the case of using a metal-supported catalyst obtained by supporting a metal and/or a metal compound on a carrier, the inventors found that a metal-supported catalyst having a rate of decrease in the metal and/or the metal compound of 20 wt % or more when shaken in an aqueous solution of polyvinylpyrrolidone under predetermined conditions has excellent catalytic activity and thus enables a high hydrogenation ratio to be achieved, and completed the present invention.

That is, the present invention provides a metal-supported catalyst obtained by supporting a metal and/or a metal compound on a carrier, wherein a rate of decrease in the metal and/or the metal compound contained in the metal-supported catalyst is 20 wt % or more when the metal-supported catalyst is shaken in an aqueous solution of 2.3 wt % of polyvinylpyrrolidone in a hydrogen atmosphere at a temperature of 50° C. at 36 rpm for 1 hour.

The metal-supported catalyst of the present invention is preferably obtained by supporting a platinum group element and/or a platinum group element-containing compound as the metal and/or the metal compound on a carrier.

In the metal-supported catalyst of the present invention, a weight average molecular weight, in terms of polystyrene, of polyvinylpyrrolidone contained in the aqueous solution of polyvinylpyrrolidone is preferably 8,000 to 12,000.

In the metal-supported catalyst of the present invention, a 50% cumulative diameter in a volume-based particle size distribution is preferably more than 0 μm and 100 μm or less.

In the metal-supported catalyst of the present invention, a 50% cumulative diameter in a number-based particle size distribution is preferably more than 0 μm and 2 μm or less.

Also, the present invention provides a method for producing a hydrogenated, conjugated diene-based polymer, comprising hydrogenating a conjugated diene-based polymer in a solvent in the presence of the above metal-supported catalyst.

Effects of Invention

The present invention provides a metal-supported catalyst capable of achieving a high hydrogenation ratio and a method for producing a hydrogenated, conjugated diene-based polymer using such a metal-supported catalyst.

DESCRIPTION OF EMBODIMENTS

Metal-Supported Catalyst

The metal-supported catalyst of the present invention is obtained by supporting a metal and/or a metal compound on a carrier, wherein a rate of decrease in the metal and/or the metal compound contained in the metal-supported catalyst is 20 wt % or more when the metal-supported catalyst is shaken in an aqueous solution of 2.3 wt % of polyvinylpyrrolidone in a hydrogen atmosphere at a temperature of 50° C. at 36 rpm for 1 hour.

The metal and/or the metal compound constituting the metal-supported catalyst may be a metal or a metal compound used as a catalyst of a hydrogenation reaction of conjugated diene-based polymers, and is not particularly limited. From the viewpoint of catalytic activity, platinum group elements and/or platinum group element-containing compounds, i.e., ruthenium, rhodium, palladium, osmium, iridium or platinum, or compounds containing them, are preferably used. Among these, palladium, rhodium, or compounds thereof are preferable, and palladium or a palladium compound is more preferable. Although two or more platinum group elements and platinum group element-containing compounds may be used in combination, also in such a case palladium or a palladium compound is preferably a main catalyst component.

As the palladium compound, usually a divalent or tetravalent palladium compound is used, and is in the form of a salt or a complex salt.

Examples of the palladium compound include palladium acetate, palladium cyanide, palladium fluoride, palladium chloride, palladium bromide, palladium iodide, palladium nitrate, palladium sulfate, palladium oxide, palladium hydroxide, dichloro(cyclooctadiene) dichloro(norbornadiene) palladium, dichlorobis(triphenyl phosphine) palladium, sodium tetrachloropalladate, ammonium hexachloropalladate, potassium tetracyanopalladate, and the like.

Among these palladium compounds, palladium acetate, palladium nitrate, palladium sulfate, palladium chloride, sodium tetrachloropalladate, and ammonium hexachloropalladate are preferable, and palladium acetate, palladium nitrate, and palladium chloride are more preferable.

Examples of the rhodium compound include rhodium chloride, rhodium bromide, rhodium iodide, rhodium nitrate, rhodium sulfate, rhodium acetate, rhodium formate, rhodium propionate, rhodium butyrate, rhodium valerate, rhodium naphthenate, rhodium acetylacetonate, rhodium oxide, rhodium trihydroxide, and the like.

The carrier for forming the metal-supported catalyst may be a carrier that is commonly used as a carrier of a metal catalyst. Specifically, activated carbon commonly used as an adsorbent; and inorganic compounds containing silicon, aluminum, magnesium, and the like are preferable.

It is preferable to suitably select such a carrier from known catalyst carriers such as activated carbon, activated clay, talc, clay, alumina gel, silica, diatomaceous earth, and synthetic zeolite. Examples of the method for supporting a metal or a metal compound as a catalyst component on a carrier include an impregnation method, a coating method, a spraying method, a precipitation method, and the like. The amount of the metal or the metal compound supported is preferably 0.1 to 20 wt %, more preferably 0.1 to 10 wt %, and further preferably 0.1 to 5 wt % in terms of the ratio of the metal or the metal compound to the total amount of the metal or the metal compound as a catalyst component and the carrier.

The metal-supported catalyst of the present invention has a rate of decrease in the metal and/or the metal compound contained in the metal-supported catalyst of 20 wt % or more, preferably 25 wt % or more, and more preferably 30 wt % or more, when shaken in an aqueous solution of 2.3 wt % of polyvinylpyrrolidone (PVP) in a hydrogen atmosphere at a temperature of 50° C. at 36 rpm for 1 hour (hereinafter referred to as a "rate of decrease in the metal when dispersed in PVP" as applicable). The upper limit is not particularly limited, and is usually 70 wt % or less. According to the present invention, configuring the rate of decrease in the metal when dispersed in PVP to be in the above range enables the catalytic activity of the metal-supported catalyst to be improved, thereby making it possible to achieve a high hydrogenation ratio when the metal-supported catalyst is used as a catalyst for a hydrogenation reaction. In the present invention, the rate of decrease in the metal when dispersed in PVP can be calculated according to the following formula (1), and a higher rate of decrease in the metal when dispersed in PVP means a smaller amount of the metal and/or the metal compound in the metal-supported catalyst after being dispersed.

Rate of decrease in metal when dispersed in PVP (wt %)=100−("Weight (g) of metal and/or metal compound contained in metal-supported catalyst after being shaken in an aqueous solution of PVP"÷"Weight (g) of metal and/or metal compound contained in metal-supported catalyst before being shaken in an aqueous solution of PVP")×100   (1)

In particular, in order to obtain a sufficient hydrogenation ratio even when a catalyst is used in a small amount, the inventors conducted diligent research on the relationship between a metal-supported catalyst obtained by supporting a metal and/or a metal compound on a carrier and a hydrogenation rate when the catalyst is used. As a result of conducting diligent research, the inventors found that as the rate of decrease in the metal when dispersed in PVP is increased, catalytic activity, in particular the hydrogenation ratio when the catalyst is used as a catalyst for a hydrogenation reaction, is increased, and completed the present invention.

Although it is not necessarily clear why configuring the rate of decrease in the metal when dispersed in PVP to be in the above range enables catalytic activity, in particular the hydrogenation ratio when the catalyst is used as a catalyst for a hydrogenation reaction, to be increased, for example, possible reasons are as follows. That is, a large rate of decrease in the metal when dispersed in PVP means that the amount of the metal and/or the metal compound as a catalyst component, which is contained in the metal-supported catalyst and eluted into an aqueous solution of polyvinylpyrrolidone when the metal-supported catalyst is shaken in the aqueous solution of polyvinylpyrrolidone, is large. That is, it can be thought that the amount of the metal and/or the metal compound that can be contacted with polyvinylpyrrolidone is also large. Accordingly, it is presumed that a large rate of decrease in the metal when dispersed in PVP yields an increased amount of the metal and/or the metal compound as a catalyst component, which is contained in the metal-supported catalyst and can be contacted with a conjugated diene-based polymer subjected to a hydrogenation reaction when a hydrogenation reaction of the conjugated diene-based polymer is actually carried out, and thus a high hydrogenation ratio can be achieved.

When measuring the rate of decrease in the metal when dispersed in PVP, the metal-supported catalyst may be shaken in an aqueous solution of 2.3 wt % of PVP in a hydrogen atmosphere at a temperature of 50° C. at 36 rpm for 1 hour. The proportions of the metal-supported catalyst and the aqueous solution of PVP in this case may be 0.75:100 in terms of the weight ratio of "the metal-supported catalyst:the aqueous solution of PVP", and the pressure in the system at this time may be 1 MPa (a gauge pressure). As polyvinylpyrrolidone constituting the aqueous solution of PVP, polyvinylpyrrolidone having a weight average molecular weight in terms of polystyrene in the range of 8,000 to 12,000 may be used.

The method for configuring the rate of decrease in the metal when dispersed in PVP to be 20 wt % or more is not particularly limited, and examples include a method involving crushing a metal-supported catalyst obtained by an immersion method, a coating method, a spraying method, a precipitation method, or the like. In this case, it is preferable to carry out crushing such that the 50% cumulative diameter in a volume-based particle diameter distribution is preferably more than 0 μm and 100 μm or less, and more preferably more than 0 μm and 50 μm or less. Alternatively, it is preferable to carry out crushing such that the 50% cumulative diameter in a number-based particle diameter distribution is preferably more than 0 μm and 2 μm or less, and more preferably more than 0 μm and 1 μm or less. As a method for configuring the rate of decrease in the metal when dispersed in PVP to be 20 wt % or more, for example, a method involving using a carrier having a small particle size, a method involving using a carrier having a large specific surface area, or the like can be used other than the method involving crushing.

Method for Producing Hydrogenated, Conjugated Diene-Based Polymer

The method for producing a hydrogenated, conjugated diene-based polymer of the present invention comprises hydrogenating a conjugated diene-based polymer in a solvent in the presence of the metal-supported catalyst of the present invention described above.

In the production method of the present invention, hydrogenation is a reaction in which at least some of the carbon-carbon double bonds contained in a conjugated diene-based polymer are hydrogenated for conversion to saturated bonds. The conjugated diene-based polymer used in the present invention is a polymer produced by a conventionally known emulsion polymerization method or solution polymerization method, preferably an emulsion polymerization method, using a conjugated diene monomer alone or a conjugated diene monomer in combination with a monomer that is copolymerizable with the conjugated diene monomer.

The conjugated diene monomer for forming a conjugated diene-based polymer is not particularly limited as long as it is a polymerizable monomer having a conjugated diene structure, and examples include 1,3-butadiene, 2-methyl-1,3-butadiene (isoprene), 2,3-dimethyl-1,3-butadiene, 2-chloro-1,3-butadiene, 1,3-pentadiene, and the like. Among these, 1,3-butadiene and 2-methyl-1,3-butadiene are preferable, and 1,3-butadiene is more preferable.

Examples of the monomer copolymerizable with a conjugated diene monomer include α,β-ethylenically unsaturated nitrile monomers such as acrylonitrile, methacrylonitrile, and crotononitrile; α,β-ethylenically unsaturated carboxylic acids such as acrylic acid, methacrylic acid, crotonic acid, fumaric acid, maleic acid, and itaconic acid; α,β-ethylenically unsaturated carboxylic acid esters such as methyl acrylate, n-butyl acrylate, 2-ethylhexyl acrylate, trifluoroethyl acrylate, and methyl methacrylate; α,β-ethylenically unsaturated carboxylic acid amides such as acrylamide and methacrylamide; vinyl aromatic compounds such as styrene, α-methylstyrene, p-methylstyrene, and divinylbenzene; vinyl esters such as vinyl acetate and vinyl propionate; vinyl ether compounds such as fluoroethyl vinyl ether; and the like.

Specific examples of the conjugated diene-based polymer used in the present invention include a butadiene polymer, an isoprene polymer, a butadiene-styrene copolymer, an acrylonitrile-butadiene copolymer, an acrylonitrile-isoprene copolymer, an acrylonitrile-butadiene-isoprene copolymer, a methacrylonitrile-butadiene copolymer, a methacrylonitrile-isoprene copolymer, a methacrylonitrile-butadiene-isoprene copolymer, an acrylonitrile-methacrylonitrile-butadiene copolymer, an acrylonitrile-butadiene-methyl acrylate copolymer, an acrylonitrile-butadiene-acrylic acid copolymer, an acrylonitrile-butadiene-acrylic acid ester copolymer, and the like.

Among the above conjugated diene-based polymers, from the viewpoint of practicality and versatility as a production raw material of the hydrogenated, conjugated diene-based polymer, an acrylonitrile-butadiene copolymer, a methacrylonitrile-butadiene copolymer, and an acrylonitrile-butadiene-acrylic acid ester copolymer are preferable, and an acrylonitrile-butadiene copolymer is more preferable.

The compositional ratio of monomer units constituting the conjugated diene-based polymer is not particularly limited, and preferably, the conjugated diene monomer unit is 5 to 100 wt % and the unit of a monomer copolymerizable therewith is 95 to 0 wt %, and more preferably, the conjugated diene monomer unit is 10 to 90 wt % and the unit of a monomer copolymerizable therewith is 90 to 10 wt %. The weight average molecular weight (a gel permeation chromatography method, in terms of standard polystyrene) of the conjugated diene-based polymer is also not particularly limited, and is usually 5,000 to 500,000.

In the emulsion polymerization method as a suitable method for preparing a conjugated diene-based polymer, polymerization is generally carried out in an aqueous medium using a radical polymerization initiator, and in the emulsion polymerization method, a known polymerization initiator and molecular weight modifier may be used. The polymerization reaction may be batch-wise, semibatch-wise, or continuous, and the polymerization temperature and the pressure are also not particularly limited. The emulsifier to be used is also not particularly limited, and an anionic surfactant, a cationic surfactant, an amphoteric surfactant, a nonionic surfactant, and the like can be used, and an anionic surfactant is preferable. These emulsifiers may be used singly or in combinations of two or more. The amount thereof used is not particularly limited.

The solids concentration of the conjugated diene-based polymer latex obtained by emulsion polymerization is not particularly limited, and is usually 2 to 70 wt % and preferably 5 to 60 wt %. The solids concentration thereof can be suitably regulated by a known method such as a blending method, a dilution method, or a concentration method.

The hydrogenation reaction of the conjugated diene-based polymer may be carried out on the latex obtained by emulsion polymerization while the polymer is in a latex state, and from the viewpoint of catalytic activity and the like, it is preferable to carry out the hydrogenation reaction in a polymer solution state after coagulating and drying the latex obtained by emulsion polymerization and then dissolving the obtained conjugated diene-based polymer rubber in an appropriate organic solvent.

Coagulation and drying of the latex may be carried out by a known method, and it is preferable to provide a treatment step of contacting crumbs obtained by coagulation with a basic aqueous solution to thereby modify such that the pH of a polymer solution measured when the obtained conjugated diene-based polymer rubber is dissolved in tetrahydrofuran (THF) exceeds 7. The pH of the solution measured when the polymer solution is dissolved in THF is preferably in the range of 7.2 to 12, more preferably 7.5 to 11.5, and most preferably 8 to 11. This contact treatment of crumbs and a basic aqueous solution enables hydrogenation of a solution system to promptly proceed.

The solution concentration of the conjugated diene-based polymer in the polymer solution is preferably 1 to 70 wt % and more preferably 2 to 40 wt %. Examples of the organic solvent include aliphatic hydrocarbons such as n-hexane, cyclohexane, and n-heptane; aromatic hydrocarbons such as benzene, toluene, xylene, and chlorobenzene; ketones such as acetone, methyl ethyl ketone, diethyl ketone, methyl isopropyl ketone, 2-pentanone, 3-pentanone, cyclopentanone, and cyclohexanone; ethers such as diethyl ether, tetrahydrofuran, dioxane, and anisole; esters such as ethyl acetate; and the like. Among these organic solvents, ketones are preferably used, and acetone is particularly suitably used.

The temperature of the hydrogenation reaction is usually 0 to 200° C., preferably 5 to 150° C., and more preferably 10 to 100° C. Configuring the temperature of the hydrogenation reaction to be in the above range enables a sufficient reaction rate to be obtained while suppressing side reactions.

The pressure of hydrogen when carrying out the hydrogenation reaction is usually 0.1 to 20 MPa, preferably 0.1 to 15 MPa, and more preferably 0.1 to 10 MPa as a gauge pressure. The reaction time is not particularly limited, and is usually 30 minutes to 50 hours. As for hydrogen gas, the reaction system is preferably first purged with an inert gas such as nitrogen, further purged with hydrogen, and then pressurized.

According to the method for producing a hydrogenated, conjugated diene-based polymer of the present invention, the metal-supported catalyst of the present invention described above is used, and thus even when the amount of the metal-supported catalyst used is relatively small, a high hydrogenation ratio can be achieved. As a result, production efficiency can be increased.

EXAMPLES

Below, the present invention will now be described by way of more detailed Examples, but the present invention is not limited to the Examples. The "part" below is based on weight unless specified otherwise. Tests and evaluations were performed as follows.

Rate of Decrease in Metal when Dispersed in PVP

To a 100 ml stainless-steel pressure vessel, 0.15 g of a $Pd/SiO_2$ catalyst and 20 g of an aqueous solution of polyvinylpyrrolidone (PVP) (PVP: manufactured by Ashland, PVP-K15, weight average molecular weight in terms of polystyrene: 10,000) (PVP content: 2.3 wt %) were added. Gas inside the stainless-steel pressure vessel was replaced with $H_2$, and then the pressure vessel was pressurized to 1 MPa (a gauge pressure). The stainless-steel pressure vessel was secured to a rotator provided in a thermostat having a temperature of 50° C., and shaken at a rotational speed of 36 rpm for 1 hour.

Before and after the $Pd/SiO_2$ catalyst was shaken in the aqueous solution of PVP, the $Pd/SiO_2$ catalyst was weighed, subjected to thermolysis with nitric acid, hydrofluoric acid, and sulfuric acid, and then allowed to have a fixed volume. The Pd content (g) of this solution was determined by atomic absorptiometry using an atomic absorptiometer (trade name "SPS-5000", manufactured by Seiko Instruments Inc.), and the rate of decrease in the metal when dispersed in PVP was calculated according to the following formula:

Rate of decrease in metal when dispersed in PVP (wt %)=100−("Pd content (g) in $Pd/SiO_2$ catalyst after being shaken in an aqueous solution of PVP"="Pd content (g) in $Pd/SiO_2$ catalyst before being shaken in an aqueous solution of PVP")×100

Hydrogenation Ratio

The iodine value of an acrylonitrile-butadiene copolymer before hydrogenation and the iodine value of an acrylonitrile-butadiene copolymer after hydrogenation were measured, and the hydrogenation ratio was determined from their proportions. The iodine value was measured in accordance with JIS K 6235.

Production Example 1 parts by mass of palladium chloride as a palladium compound was dissolved in 85 parts by mass of a hydrochloric acid solution as a solvent, and 10 parts by mass of silica having an average particle size of 1000 μm was impregnated. After the solvent was volatilized, calcination was performed, and thus an uncrushed $Pd/SiO_2$ catalyst in which palladium was supported on silica was obtained. The obtained uncrushed $Pd/SiO_2$ catalyst had a 50% cumulative diameter in a number-based particle size distribution of 1000 μm, and a 50% cumulative diameter in a volume-based particle size distribution of 1000 μm. The rate of decrease in the metal when dispersed in PVP of the obtained uncrushed $Pd/SiO_2$ catalyst was measured according to the method described above, and was 18 wt %.

Production Example 2

Some of the uncrushed $Pd/SiO_2$ catalyst obtained above was taken out and crushed using a compact ultra high speed crusher (trade name "Wonder Blender WB-1", manufactured by Osaka Chemical Co., Ltd.) as a crushing apparatus, and thus a crushed $Pd/SiO_2$ catalyst was obtained. The obtained crushed $Pd/SiO_2$ catalyst had a 50% cumulative diameter in a number based particle size distribution of 0.4 μm, and a 50% cumulative diameter in a volume-based particle size distribution of 25 μm. The rate of decrease in the metal when dispersed in PVP of the obtained crushed $Pd/SiO_2$ catalyst was measured according to the method described above, and was 35 wt %.

Example 1

A reactor was charged with 2 parts of potassium oleate, 180 parts of ion-exchanged water, 37 parts of acrylonitrile, and 0.5 parts of t-dodecyl mercaptan in this order. After the reactor was nitrogen-purged, 63 parts of butadiene was added, the reactor was cooled to 10° C., and 0.01 parts of cumene hydroperoxide and 0.01 parts of ferrous sulfate were added. The contents were stirred for 16 hours while retaining the reactor at 10° C. After an aqueous solution of 10 wt % of hydroquinone was added to the reactor to terminate the polymerization reaction, unreacted monomers were removed from the polymerization reaction solution, and thus an acrylonitrile-butadiene copolymer latex was obtained. The polymerization conversion was 90%.

Then, 300 parts of coagulated water in which 3 parts of calcium chloride (a coagulant) was dissolved was added to a reactor different from above, and while stirring it at 50° C., the latex obtained above was added dropwise to the coagulated water. After polymer crumbs were precipitated while maintaining pH at 11.5 by adding an aqueous solution of potassium hydroxide thereto, and the polymer crumbs were separated from the coagulated water, washed with water, and then dried under reduced pressure at 50° C. The obtained polymer crumbs were dissolved in acetone, and thus an acetone solution having a polymer content of 15 wt % was prepared.

The crushed $Pd/SiO_2$ catalyst obtained in Production Example 2 was added to the obtained acetone solution of an acrylonitrile-butadiene copolymer such that the amount of palladium was 110 wt ppm based on the acrylonitrile-butadiene copolymer. The mixture was introduced into an autoclave equipped with a stirrer, and nitrogen gas was allowed to flow for 10 minutes to remove dissolved oxygen. The system was purged with hydrogen gas twice and then pressurized with 5 MPa of hydrogen, the contents were heated to 50° C. and stirred for 6 hours to carry out a hydrogenation reaction and then dried, and thus a hydrogenated acrylonitrile-butadiene copolymer was obtained. The hydrogenation ratio of the obtained hydrogenated acrylonitrile-butadiene copolymer measured according to the above method was 90.1%.

Example 2

A hydrogenated acrylonitrile-butadiene copolymer was obtained in the same manner as in Example 1 except that the amount of the crushed Pd/SiO$_2$ catalyst obtained in Production Example 2 used was changed to an amount such that the amount of palladium was 150 wt ppm based on the acrylonitrile-butadiene copolymer. The hydrogenation ratio of the obtained hydrogenated acrylonitrile-butadiene copolymer measured according to the above method was 93.8%.

Example 3

A hydrogenated acrylonitrile-butadiene copolymer was obtained in the same manner as in Example 1 except that the amount of the crushed Pd/SiO$_2$ catalyst obtained in Production Example 2 used was changed to an amount such that the amount of palladium was 180 wt ppm based on the acrylonitrile-butadiene copolymer. The hydrogenation ratio of the obtained hydrogenated acrylonitrile-butadiene copolymer measured according to the above method was 95.4%.

Comparative Example 1

A hydrogenated acrylonitrile-butadiene copolymer was obtained in the same manner as in Example 1 except that the uncrushed Pd/SiO$_2$ catalyst obtained in Production Example 1 was used in place of the crushed Pd/SiO$_2$ catalyst obtained in Production Example 2, and the amount of the uncrushed Pd/SiO$_2$ catalyst was changed to an amount such that the amount of palladium was 180 wt ppm based on the acrylonitrile butadiene copolymer. The hydrogenation ratio of the obtained hydrogenated acrylonitrile-butadiene copolymer measured according to the above method was 88.2%.

[Table 1]

TABLE 1

| | Pd/SiO$_2$ catalyst | | |
| --- | --- | --- | --- |
| | Rate of decrease in metal when dispersed in PVP (wt %) | Amount used (wt ppm) | Hydrogenation ratio (%) |
| Example 1 | 35 | 110 | 90.1 |
| Example 2 | 35 | 150 | 93.8 |
| Example 3 | 35 | 180 | 95.4 |
| Comparative Example 1 | 18 | 180 | 88.2 |

Comparing the results of Examples 1 to 3 and Comparative Example 1, Examples 1 to 3 in which a crushed Pd/SiO$_2$ catalyst having a rate of decrease in the metal when dispersed in PVP of 35 wt % was used all resulted in better hydrogenation ratios than Comparative Example 1 in which an uncrushed Pd/SiO$_2$ catalyst having a rate of decrease in the metal when dispersed in PVP of 18 wt % was used, despite the amount of the Pd/SiO$_2$ catalyst being comparable or smaller than that in Comparative Example 1.

The invention claimed is:

1. A method for production of a metal-supported catalyst, wherein the metal-supported catalyst is formed by supporting a metal and/or a metal compound on a carrier,
   a rate of decrease in the metal and/or the metal compound contained in the metal-supported catalyst is 25 wt % or more when the metal-supported catalyst is shaken in an aqueous solution of 2.3 wt % of polyvinylpyrrolidone in a hydrogen atmosphere at a temperature of 50° C. at 36 rpm for 1 hour, and
   the method comprises:
   supporting a metal and/or a metal compound on a carrier to obtain an uncrushed metal-supported material; and
   crushing the uncrushed metal-supported material,
   wherein the carrier is silica.

2. The method for production of a metal-supported catalyst according to claim 1, wherein the metal and/or the metal compound is a platinum group element and/or a platinum group element-containing compound.

3. The method for production of a metal-supported catalyst according to claim 1, wherein a weight average molecular weight, in terms of polystyrene, of polyvinylpyrrolidone contained in the aqueous solution of polyvinylpyrrolidone is 8,000 to 12,000.

4. The method for production of a metal-supported catalyst according to claim 1, wherein crushing is carried out so as to obtain the metal-supported catalyst having a 50% cumulative diameter in a volume-based particle size distribution of more than 0 μm and 100 μm or less.

5. The method for production of a metal-supported catalyst according to claim 1, wherein crushing is carried out so as to obtain the metal-supported catalyst having a 50% cumulative diameter in a number-based particle size distribution of more than 0 μm and 2 μm or less.

6. The method for production of a metal-supported catalyst according to claim 1, wherein the rate of decrease in the metal and/or the metal compound contained in the metal-supported catalyst is 30 wt % or more.

* * * * *